US012638702B2

(12) United States Patent
Zhang et al.

(10) Patent No.: US 12,638,702 B2
(45) Date of Patent: May 26, 2026

(54) SMART GLASSES

(71) Applicant: BEIJING UNICORN TECHNOLOGY CO., LTD., Beijing (CN)

(72) Inventors: Tongfu Zhang, Beijing (CN); Yuanyuan Wu, Beijing (CN); Yafeng Zhou, Beijing (CN); Yue He, Beijing (CN)

(73) Assignee: BEIJING UNICORN TECHNOLOGY CO., LTD., Beijing (CN)

( * ) Notice: Subject to any disclaimer, the term of this patent is extended or adjusted under 35 U.S.C. 154(b) by 363 days.

(21) Appl. No.: 18/255,587

(22) PCT Filed: Sep. 29, 2022

(86) PCT No.: PCT/CN2022/122740
§ 371 (c)(1),
(2) Date: Jun. 2, 2023

(87) PCT Pub. No.: WO2023/051724
PCT Pub. Date: Apr. 6, 2023

(65) Prior Publication Data
US 2024/0027796 A1 Jan. 25, 2024

(30) Foreign Application Priority Data

Sep. 29, 2021 (CN) .......................... 202111153083.4

(51) Int. Cl.
*G02C 5/14* (2006.01)
*G02C 5/16* (2006.01)
(Continued)

(52) U.S. Cl.
CPC ................ *G02C 11/10* (2013.01); *G02C 5/14* (2013.01); *G02C 5/143* (2013.01); *G02C 5/146* (2013.01);
(Continued)

(58) Field of Classification Search
CPC .......... G02C 11/10; G02C 5/14; G02C 5/143
See application file for complete search history.

(56) References Cited

U.S. PATENT DOCUMENTS

| | | | |
|---|---|---|---|
| 5,030,003 A | 7/1991 | Iwane et al. | |
| 7,035,110 B1 * | 4/2006 | Wang ................... | H05K 5/0278 |
| | | | 361/752 |

(Continued)

FOREIGN PATENT DOCUMENTS

| | | |
|---|---|---|
| AU | 2021101502 A4 | 5/2021 |
| CN | 200979620 Y | 11/2007 |

(Continued)

OTHER PUBLICATIONS

International Search Report received in the corresponding International Application PCT/CN2022/122740, mailed Dec. 19, 2022.
(Continued)

*Primary Examiner* — Christopher Stanford
(74) *Attorney, Agent, or Firm* — K&L Gates LLP

(57) ABSTRACT

The present application relates to smart glasses including: a frame; a first temple and a second temple, head ends of which are connected to two opposite sides of the frame, the first temple and the second temple each including a first temple member and a second temple member arranged opposite to each other, the first temple member and the second temple member being connected to form an accommodating cavity; a first circuit board accommodated in the accommodating cavity; an external interface provided at a tail end of at least one of the first temple and the second
(Continued)

temple, the external interface being electrically connected to the first circuit board; and a first fastener fitted over an outer periphery of the tail end of the temple provided with the external interface, to fix tail ends of the connected first temple member and second temple member. In the present application, the tail end of the temple provided with the external interface is fixed by the first fastener, which can ensure the reliability of the fixation of the tail end of the temple, and improve the stability of connection between the external interface and an external device, thereby ensuring the reliability of transmission. Furthermore, the two temples are each configured as an inside and outside combination of the first temple member and the second temple member, such that disassembly, assembly and maintenance are convenient.

18 Claims, 4 Drawing Sheets

(51) Int. Cl.
    *G02C 5/20*           (2006.01)
    *G02C 9/04*           (2006.01)
    *G02C 11/00*        (2006.01)

(52) U.S. Cl.
    CPC ................. *G02C 5/16* (2013.01); *G02C 5/20* (2013.01); *G02C 9/04* (2013.01)

(56) References Cited

U.S. PATENT DOCUMENTS

| | | | | |
|---|---|---|---|---|
| 7,452,071 B2 * | 11/2008 | Daems | ..................... | G02C 5/00 |
| | | | | 351/111 |
| 9,910,292 B2 * | 3/2018 | Tirindelli | ............... | G02C 5/008 |
| 11,630,332 B2 * | 4/2023 | Cheng | ................... | G02C 11/10 |
| | | | | 351/111 |
| 2019/0204617 A1 * | 7/2019 | Yang | ........................ | H04R 5/02 |
| 2021/0263343 A1 | 8/2021 | Paulet Vazquez | | |

FOREIGN PATENT DOCUMENTS

| | | | |
|---|---|---|---|
| CN | 206020835 | U | 3/2017 |
| CN | 206920744 | U | 1/2018 |
| CN | 209265077 | U | 8/2019 |
| CN | 110568631 | A | 12/2019 |
| CN | 211402938 | U | 9/2020 |
| CN | 212009199 | U | 11/2020 |
| CN | 112433366 | A | 3/2021 |
| CN | 113126321 | A | 7/2021 |
| CN | 213634034 | U | 7/2021 |
| CN | 113759573 | A | 12/2021 |
| CN | 113848650 | A | 12/2021 |
| CN | 216118270 | U | 3/2022 |
| JP | 3232314 | U | 6/2021 |
| WO | 2023051724 | A1 | 4/2023 |

OTHER PUBLICATIONS

First OA Received in CN Application No. 202111153083.4; mailed Dec. 12, 2024.

EESR Received in EP Application No. 22875105.3; mailed Oct. 8, 2024.

The Rejection Decision received in the counterpart CN application 202111153083.4, dated Jun. 26, 2025, 12 pages with English translation.

* cited by examiner

70

6

14

24

102

8

$d_{11}$ $d_{12}$

13

14

SMART GLASSES

The present disclosure claims priority of Chinese patent application No. CN 202111153083.4, filed with Chinese Patent Office on Sep. 29, 2021, and entitled "Smart Glasses", which is hereby incorporated by reference in its entirety.

TECHNICAL FIELD

The present application relates to the technical field of electronic devices, in particular to smart glasses.

BACKGROUND

Head-mounted display devices (e.g., AR, VR and MR glasses and other smart glasses) can be connected to an external device (e.g., a cell phone) to display contents of the external device. In practical applications, smart glasses can usually be connected to a cell phone through a data cable. A data cable interface can be arranged at a tail end of a temple of the smart glasses, with a hardware structure of the data cable interface being arranged within the temple. In order to adapt to head circumferences of different users, a temple is expected to be deformable, while deformation results in that the stability of connection between the data cable interface provided at its tail and the data cable may be inadequate, leading to unstable data transmission, or even directly causing interruption of data transmission in use, which affects user experience.

SUMMARY

The present application provides smart glasses including: a frame having two opposite sides, configured to accommodate optical components; a first temple and a second temple, having head ends respectively connected to the two opposite sides, the first temple and the second temple each including a first temple member and a second temple member arranged opposite to each other, the first temple member and the second temple member being connected to define an accommodating cavity; a printed circuit board accommodated in the accommodating cavity; an external interface provided at a tail end of at least one of the first temple and the second temple, and electrically connected to the printed circuit board; and an interface fastener fitted over an outer periphery of the tail end of the temple provided with the external interface, to fix tail ends of the connected first temple member and second temple member.

BRIEF DESCRIPTION OF THE DRAWINGS

In the accompanying drawings, which are not necessarily drawn to scale, same reference signs may be used in different views to describe similar components. Same reference signs with letter suffixes or different letter suffixes may denote different examples of similar components. The drawings generally show various embodiments by way of example rather than limitation, and are used together with the specification and the claims to illustrate the embodiments of the application. Where appropriate, same reference signs are used in all drawings to denote same or similar parts. Such embodiments are illustrative and are not intended to be exhaustive or exclusive embodiments of the present apparatus or method.

DETAILED DESCRIPTION

Figures 1, 2:
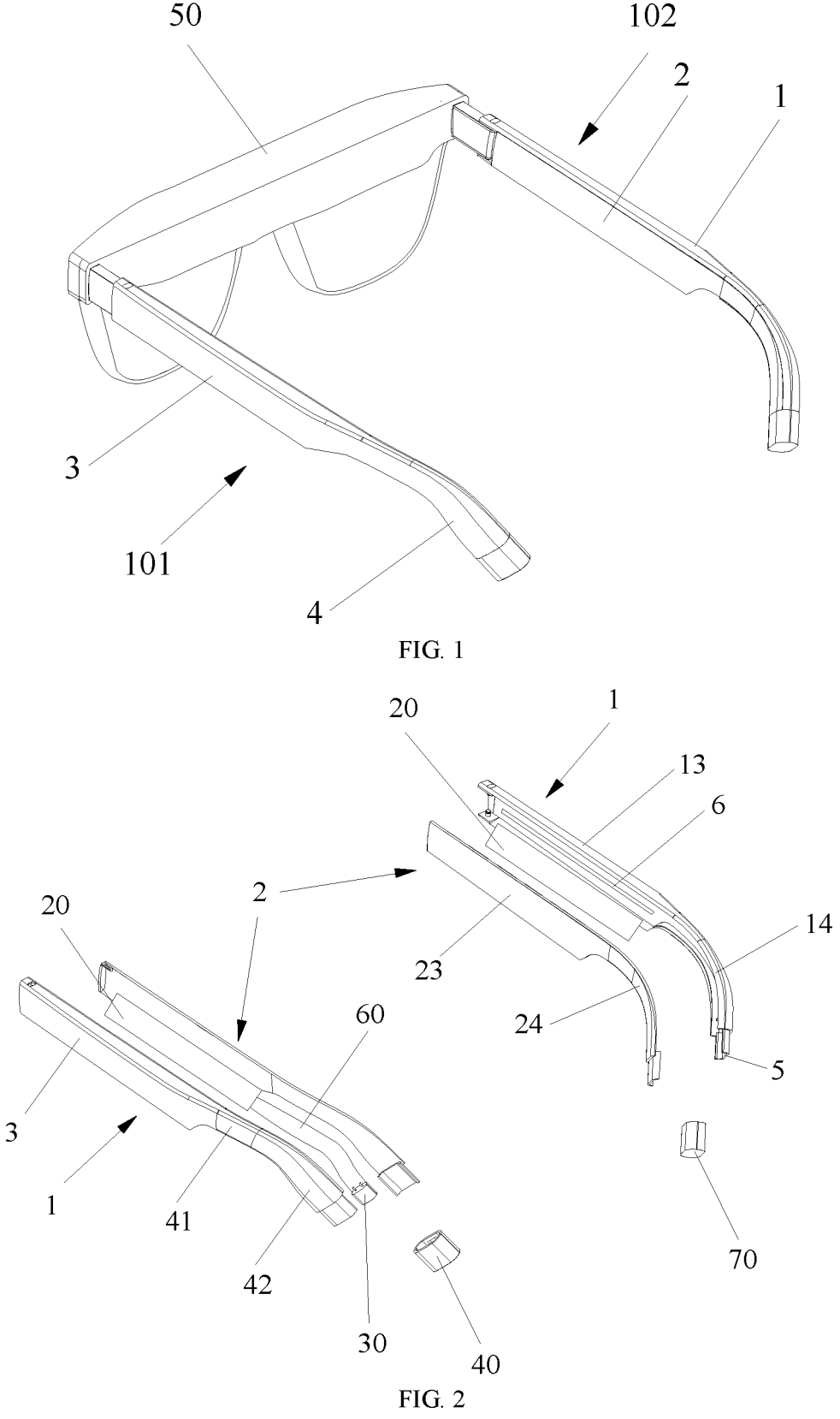
FIG. 1 is an overall structural diagram of smart glasses in accordance with embodiments of the present application.
FIG. 2 is an exploded structural diagram of a first temple and a second temple of smart glasses in accordance with embodiments of the present application.

In order to make the objects, technical solutions, and advantages of embodiments of the present application more apparent, the technical solutions in embodiments of the present application will be described clearly and completely in conjunction with the drawings in embodiments of the present application.

Unless otherwise defined, technical or scientific terms used in the present application shall have ordinary meanings understood by those of ordinary skill in the art to which the present application pertains. The term "first", "second" and the like used in present application do not indicate any order, quantity or importance, but are only used to distinguish different components. The term "comprise" or "include" or the like means that an element or item appearing before such a word covers listed elements or items appearing after the term and equivalents thereof, and does not exclude other elements or items. The term "connect" or "interconnect" or the like is not limited to physical or mechanical connections, but can include electrical connections, regardless of direct or indirect connections. The term "up", "down", "left", "right" and the like are only used to indicate a relative positional relationship. When the absolute position of a described object changes, the relative positional relationship may also change accordingly.

To keep the following description of the embodiments of the present application clear and concise, detailed description of known functions and known components is omitted from the present application.

Embodiments of the present application provide smart glasses. The smart glasses include a frame 50 for accommodating optical components, a first temple 101, and a second temple 102. Head ends of the first temple 101 and the second temple 102 are connected to two opposite sides of the frame 50, and tail ends of the first temple 101 and the second temple 102 are away from the frame 50 and are free ends. The first temple 101 and the second temple 102 each include a straight portion and a bent portion connected in sequence from the head end to the tail end. The bent portion includes a first bent segment and a second bent segment connected in sequence from the straight portion.

Optionally, the optical components may include optical elements. The optical elements may have various optical properties, such as having diopter, and may also have polarization, refraction, reflection, and other properties. The optical elements can be arc pieces with a certain curvature or flat pieces with a flat surface.

Optionally, the first bent portion has stronger deformability than the straight portion and the second bent portion.

The configuration described above makes a part of the temple near the tail end more easily deformable. On the one hand, for example, when a user with a wide head wears the smart glasses, if the distance between the tail ends of the two temples is smaller than the width of the user's head, the tail ends of the two temples need to be moved away from each other by deformation of the parts of the temples near the tail ends, so that the user can wear the smart glasses smoothly. On the other hand, after a user wears the smart glasses, the tail ends of the two temples can clamp the head. For a user with a larger head circumference, the parts of the temples near the tail ends being deformable can improve the comfort for the head clamped by the temples.

Optionally, the distance between the tail ends of the two temples is smaller than the distance between the head ends thereof. After a user wears the smart glasses, the tail ends of the two temples can better clamp the head to improve the stability of wearing. For example, it can prevent the smart glasses from slipping off when the user lowers his head.

Figures 3, 4:
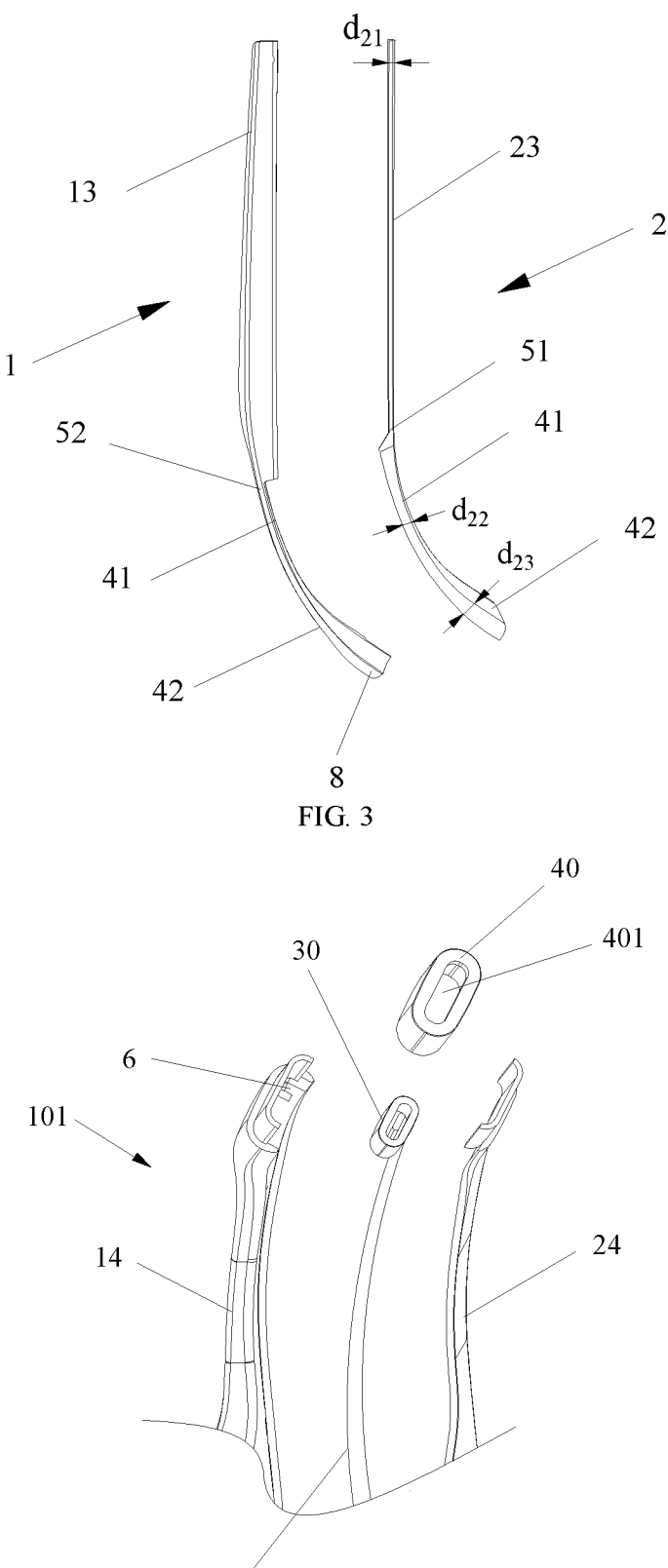
FIG. 3 is a structural diagram of the first temple or the second temple in FIG. 2 along another direction.
FIG. 4 is a partial structural diagram of a bent portion of a first temple in accordance with embodiments of the present application.
Figure 7:
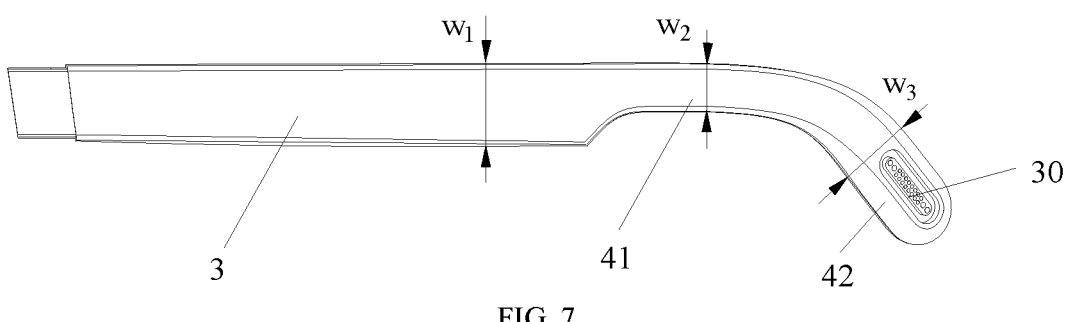
FIG. 7 is another structural diagram of a first temple or a second temple in embodiments of the present application (including a magnetic connection interface).

Therefore, the above solution can improve the reliability of wearing the glasses and the universality of the smart glasses. In some embodiments, the smart glasses need to be connected to a power source or an external device by using a data cable to implement charging or data transmission. Optionally, an external interface 30 can be provided on a temple of the smart glasses to connect a data cable. In some embodiments, an external device can be an electronic device such as a cell phone, a tablet computer, or a smart watch. For example, the external interface 30 can be connected to an external device via a data cable to transmit signals, data, and electrical energy, etc. from the external device to the smart glasses by data cable transmission. The external interface 30 can be of various types capable of transmitting at least one of electrical energy and data, such as a Type-C interface. The type of connection of the external interface 30 may be a magnetic connection interface, as shown in FIG. 7, and may also be a plug-in interface, as shown in FIGS. 2 and 4.

FIGS. 1 to 6 show structural diagrams of smart glasses in accordance with embodiments of the present application. FIG. 7 shows a structural diagram of a temple of another smart glasses in accordance with embodiments of the present application. Smart glasses provided in accordance with embodiments of the present application include: a frame 50, the frame 50 being configured to accommodate optical components; a first temple 101 and a second temple 102, head ends of the first temple 101 and the second temple 102 being connected to two opposite sides of the frame 50, the first temple 101 and the second temple 102 each including a first temple member 1 and a second temple member 2 arranged opposite to each other, the first temple member 1 and the second temple member 2 being connected to form an accommodating cavity; a first circuit board 20 accommodated in the accommodating cavity; an external interface 30 provided at a tail end of at least one of the first temple 101 and the second temple 102, the external interface 30 being electrically connected to the first circuit board 20; and a first fastener 40 fitted over an outer periphery of the tail end of the temple provided with the external interface 30, to fix tail ends of the connected first temple member 1 and second temple member 2. The first fastener may also be called an "interface fastener".

Optionally, the first fastener is fixedly connected to the tail end of the temple.

In the smart glasses provided in embodiments of the present application, by providing the external interface 30 at the tail end (an end away from the frame 50) of at least one temple, and fixing the tail end of the temple provided with the external interface 30 by the first fastener 40, it can ensure the reliability of the fixation of the tail end of the temple, and improve the stability of connection between the external interface 30 and an external device, thereby ensuring the reliability of transmission of signals, data, etc. Furthermore, the two temples are each provided with the first temple member 1 and the second temple member 2 which are combined from inside to outside, which facilitates arrangement of the first circuit board 20 or a hardware structure of the external interface 30 in the accommodating cavity formed by connecting the first temple member 1 and the second temple member 2, such that disassembly, assembly and maintenance are convenient.

In embodiments of the present application, by means of the first fastener 40, the tail end of the temple provided with the external interface 30 is fixed reliably, i.e., the tail ends of the first temple member 1 and the second temple member 2 are fixed reliably, so the stability of the external interface can be ensured when a part of the temple near the tail end is deformed.

As shown in FIGS. 2 and 4, in the case the external interface 30 is a plug-in interface, it can be arranged at an end of the tail end of at least one of the first temple 101 and the second temple 102. As shown in FIG. 7, in the case the external interface 30 is a magnetic interface, it can be arranged at a side of the tail end of at least one of the first temple 101 and the second temple 102. Since the magnetic interface is capable of attraction in two directions, a user can flexibly adjust the direction of a data cable according to a posture at the time of wearing. For example, if the user wears the smart glasses with his upper body upright, the cable can be attracted in a direction that allows the cable to extend backward, so that the cable is located on a back side of his head. If the user wears the smart glasses while lying flat, the data cable can be attracted in a direction that allows the cable to extend forward, so that the cable is located on a front side of his head and does not affect the user lying flat.

Optionally, the temples are connected to the frame 50 in a pivotally connecting manner, the temples are easy to fold to facilitate storing, which is conducive to reducing the overall volume of the smart glasses and convenient for the user to carry the same.

In some embodiments, as shown in FIGS. 1 to 7, the first temple member 1 and the second temple member 2 each include a straight portion 3 and a bent portion 4 connected in sequence from the head end to the tail end. The bent portion 4 includes a first bent segment 41 and a second bent segment 42 connected in sequence from the straight portion 3. The dimensions $w_1$, $t_1$ of the straight portion 3 and the dimensions $w_3$, $t_3$ of the second bent portion 42 are both larger than the dimensions $w_2$, $t_2$ of the first bent portion 41 in width and thickness directions of the temple.

It can be understood that the first temple 101 or the second temple 102 formed by the first temple member 1 and the second temple member 2 which are connected together also includes a straight portion 3 and a bent portion 4 connected in sequence from the head end to the tail end, and the bent portion 4 also includes a first bent segment 41 and a second bent segment 42 connected in sequence from the straight portion 3. The comparison among "the dimensions of the straight portion 3", "the dimensions of the first bent portion 41" and "the dimensions of the second bent portion 42" here means comparison among dimensions of the straight portion 3, the first bent portion 41 and the second bent portion 42 of the first temple 101 or the second temple 102 as a whole.

The width direction of the temple means respective width directions of the first temple 101 and the second temple 102 as shown in FIG. 7. The thickness direction of the temple means a direction in which the first temple 1 and the second temple 2 are opposite to each other. The thickness direction of the temple can be understood as a transverse direction shown in FIG. 3, i.e., a direction in which the narrowest side of the temple extends.

In this embodiment, along the width direction and thickness direction of the temple, the dimensions of the first bent portion 41 of the temple located in the middle is set smaller so that deformation of the part of the temple facilitates the user wearing the smart glasses. The dimensions of the straight portion 3 and the dimensions of the second bent segment 41 are set larger to provide sufficient space to mount the first circuit board 20 and the external interface 30.

In this embodiment, a first straight portion 13 of the first temple member 1 and a second straight portion 23 of the second temple member 2 are arranged opposite to each other to define a first accommodating cavity, and the first circuit board 20 is received in the first accommodating cavity. That is, the straight portions 3 of the first temple member 1 and the second temple member 2, which are arranged inside and outside, cooperate to define a first accommodating cavity for accommodating the first circuit board 20, such that the first circuit board 20 can be protected. The first circuit board 20 can be a printed circuit board.

Optionally, a first bent portion 14 of the first temple member 1 and a second bent portion 24 of the second temple member 2 are arranged opposite to each other to define a second accommodating cavity, and the smart glasses further include a second circuit board 60 arranged in the second accommodating cavity. The second circuit board 60 can be a flexible circuit board (FPC). The external interface 30 is electrically connected to the first circuit board 20 through the second circuit board 60. That is, the bent portions 4 of the first temple member 1 and the second temple member 2, which are arranged inside and outside, cooperate with each other to define a second accommodating cavity for accommodating the second circuit board 60, to facilitate electrical connection between the first circuit board 20 and external interface 30. Since the second circuit board 60 is a flexible circuit board, the second circuit board 60 can be effectively prevented from being affected when the bent portions 4 are bent, to ensure normal operation of the second circuit board 60.

In some embodiments, the first temple member 1 is made of a first material, the straight portion 3 (the second straight portion 23) of the second temple member 2 is made of a second material, and the bent portion 4 (the second straight portion 24) of the second temple member 2 is made of a third material. The hardness of the second material is greater than that of the first material, and the hardness of the first material is greater than that of the third material.

Since the second bent portion 24 contacts the user's head, the hardness of the third material of the bent portion 4 of the second temple member 2, which is located on an inner side, is set smaller, to facilitate fixing the smart glasses reliably to the user's head by bending the second bent portion 24, and the softer third material does not hurt the user's head. The hardness of the second material of the straight portion 3 of the second temple member 2 is set larger so that this part of the temple is not prone to deformation, which can effectively ensure that the rigid first circuit board 20 located in the first accommodating cavity is not squeezed. The second temple member 2 located on the inner side can be formed with the straight portion 3 and the bent portion 4, which have different hardness, by two-color injection molding, i.e., structures with different hardness can be formed by injection molding, to facilitate connection with the first temple member 1.

The hardness of the first material of the first temple member 1 arranged on an outer side is moderate, which can protect the first circuit board 20 with a certain hardness, but also the user can easily bend it, and a certain hardness can be maintained. Optionally, the first temple member 1 is made of the same material (a one-piece structure), which facilitates processing and is conducive to reducing processing costs.

Optionally, as shown in FIG. 3, in the thickness direction of the temple, the dimension $d_{21}$ of the first bent segment 41 of the second temple member 2 is larger than the dimension $d_{22}$ of the straight portion 3 of the second temple member 2, and a first connection 51 between the straight portions of the first temple member 1 and the second temple member 2 is more adjacent to the inner side of the smart glasses than a second connection 52 between the first bent segment 41 of the first temple member 1 and the first bent segment 41 of the second temple member 2, so as to bend and deform by means of the first bent portions 41 after the first temple member 1 and the second temple member 2 are jointed. The inner side of the smart glasses means a side between the first temple 101 and the second temple 102.

Optionally, as shown in FIG. 3, the dimension $d_{23}$ of the second bent portion 42 of the second temple member 2 is larger than the dimension $d_{22}$ of the first bent portion 41 of the second temple member 2, i.e., the thickness dimension of the first bent portion 41 of the second temple member 2 is set thinner and the thickness dimension of the second bent portion 42 is set thicker, so that the second bent portion 42 can be used for reliable fixation to the head while ensuring convenient bending deformation by means of the first bent portion 41.

In some embodiments, as shown in FIG. 2, in order to ensure that the straight portion 3 is not prone to deformation (especially the second straight portion 23), a reinforcing rib 7 is provided in the first accommodating cavity for arranging the first circuit board 20. The reinforcing rib 7 is formed by extending inward from inner walls defining the first accommodating cavity to effectively support the first circuit board 20 and prevent the first circuit board 20 from being squeezed.

It can be understood that the first accommodating cavity is formed after the first straight portion 13 and the second straight portion 23 are jointed, and a surface of a side of the first straight portion 13 facing the second straight portion 23 and a surface of a side of the second straight portion 23 facing the first straight portion 13 are the inner walls defining the first accommodating cavity.

Figures 5, 6:
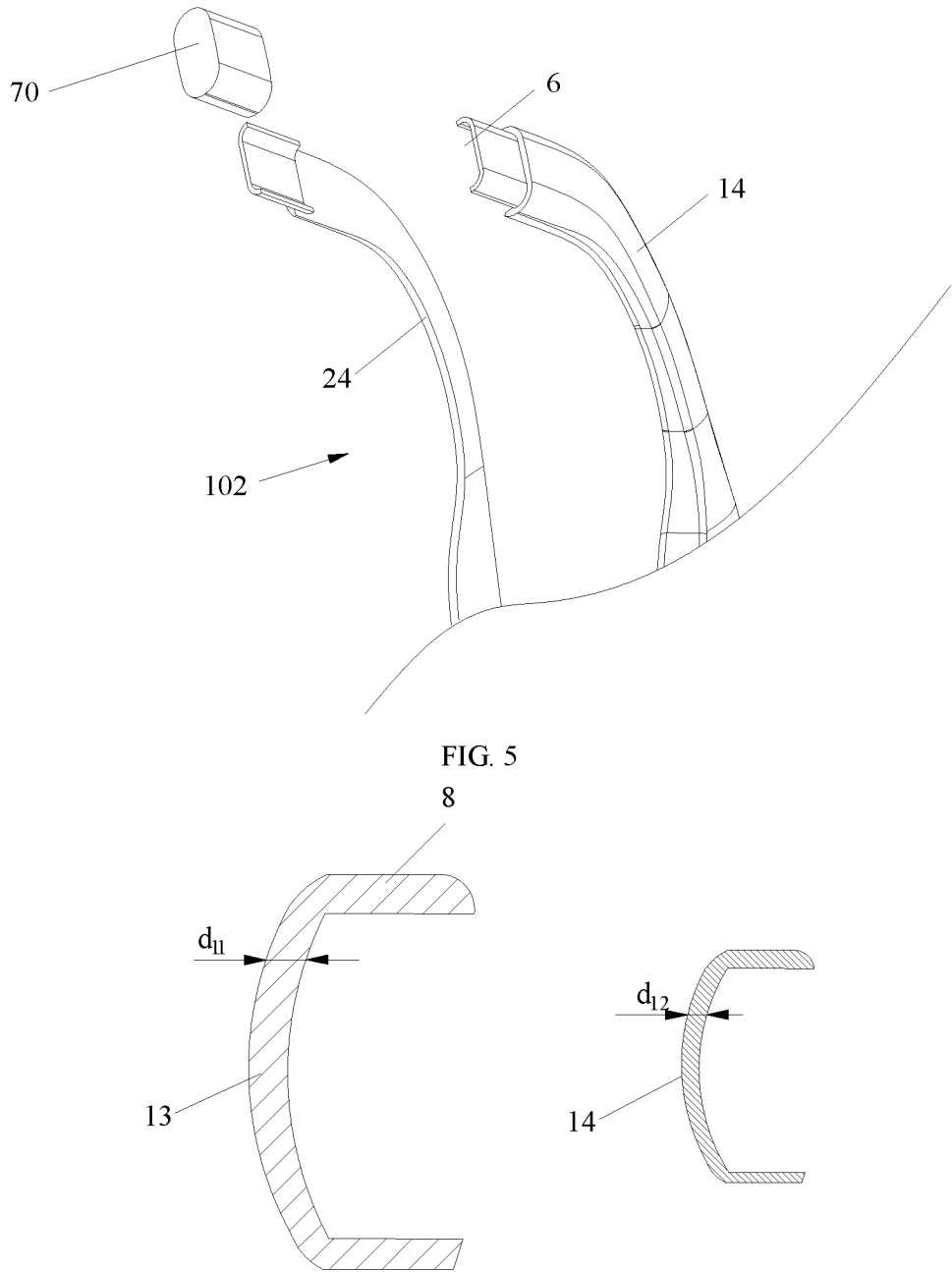
FIG. 5 is a partial structural diagram of a bent portion of a second temple in accordance with embodiments of the present application.
FIG. 6 a side sectional view of a straight portion and a side sectional view of a bent portion of a first temple member in accordance with embodiments of the present application.

In some other embodiments, as shown in FIG. 5, the wall thickness $d_{11}$ (the dimension in the thickness direction of the temple) of the straight portion 3 (first straight portion 13) of the first temple member 1 located on an outer side of the smart glasses can be set thicker than the wall thickness $d_{12}$ of the bent portion 4 (e.g., the first bent portion 14), so that the temple in the straight portion 3 is not prone to deformation to ensure that the first circuit board 20 is not squeezed. Furthermore, since the straight portion 3 is arranged adjacent to the frame 50, setting the wall thickness $d_{11}$ of the first straight portion 13 to be thicker can improve the support strength for the frame 50 and ensure the overall stability of the smart device after wearing. Optionally, since the hardness of the bent portion 4 (the second bent portion 24) of the second temple member 2 is smaller, the first bent portion 14 and the second bent portion 24 can be fixed into one piece by bonding to avoid displacement between the first temple member 1 and the second temple member 2 due to deformation.

In this embodiment, as shown in FIGS. 2 to 6, edges of two sides of the first temple member 1 extend toward the second temple member 2 (along a direction of connection with the second temple member 2) to form a bend 8, and the straight portions 3 of the first temple member 1 and the second temple member 2 are snapped together and fixedly connected by the bend 8. The bent portions 4 of the first temple member 1 and the second temple member 2 are bonded into one piece by means of the bend 8 (the first bent portion 14 and the second bent portion 24 are fixed by adhesive at the bend 8).

In this embodiment, since the first temple member 1 is provided with the bend 8, wall thicknesses of the first bent segment 41 and the second bend section 42 of the first temple member 1 can be same, both being die, or the wall thickness of the first bent segment 41 can be set thinner to facilitate bending deformation, as in the structure of the second temple member 2 described above.

Optionally, the first temple member 1 and the second temple member 2 can also be directly snapped together and connected by the bend 8 without considering a relative deviation of the first bent portion 14 and the second bent portion 24, to improve assembly efficiency.

Furthermore, using a snap-together structure for the first temple member 1 and the second temple member 2 can avoid a sense of split brought about by separated inner and outer temple members, and is conducive to an overall aesthetic appearance of the temple.

In this embodiment, since the first temple member 1 can be made of material with a single hardness and the hardness of the first temple member 1 is moderate, the above-mentioned bend 8 is easy to process on the first temple member 1. The second temple member 2 arranged on the inner side can be configured as a plate-like structure to facilitate processing and molding of the second temple member 2. In addition, since the first temple member 1 is arranged on the outer side, providing the bend 8 on the first temple member 1 can ensure a smooth sense of touch for a user and prevent cutting the user, etc. (for example, if the bend 8 is provided on the second temple member 2, the bend 8 facing outward may cut the user), while ensuring an aesthetic appearance.

In some embodiments, the tail ends of the connected first temple member 1 and second temple member 2 jointly define a first opening 6, and the external interface 30 is located in the accommodating cavity and in communication with the outside through the opening 6. That is, the hardware structure of the external interface 30 is arranged at a position in the temple adjacent to the first opening 6 to facilitate connection with an external device.

Optionally, the first fastener 40 is fitted over an outer periphery at the opening 5, and there is a smooth transition at a connection between the first fastener 40 and the bent portion 4 to ensure an aesthetic appearance of the temple. It can be understood that there is a smooth transition at a connection between the first fastener 40 and the first temple member 1 as well as the second temple member 2.

In this embodiment, the external interface 30 is provided at the tail end of the first temple 101, and the first fastener 40 is an annular member. The annular member has a second through opening 401 formed at two opposite ends, to ensure that the first opening 6 is in communication with the outside.

In some embodiments, the smart glasses further include a second fastener 70 fitted over the tail end of the second temple 102. The second fastener 70 is a cap-shaped member. The cap-shaped member is provided with a third opening at one of two opposite ends thereof and a closed end at the other end. The cap-shaped member is fitted over the tail end of the second temple 102 and closes the tail end of the second temple 102. The structure of the cap-shaped member is similar to that of the annular member except that the other end is closed. The second fastener 70 may also be called a "closure fastener".

It can be understood that the tail end of the second temple 102 also defines an opening by means of the first temple member 1 and the second temple member 2. The second fastener 70 is a cap-shaped member, and is fixedly connected to the tail end of the second temple 102 to close the opening. Optionally, there is a smooth transition at a connection between the second fastener 70 and the second temple 102. It can be understood that there is a smooth transition at a connection between the second fastener 70 and the first temple member 1 as well as the second temple member 2 of the second temple 102 so that the product appearance is aesthetically pleasing.

In this embodiment, the external interface 30 is provided only at the tail end of the first temple 101, while for the second temple 102 with no external interface 30, the cap-shaped member with a similar structure to the annular member is used to fix the tail end of the second temple 102. On the one hand, it is conducive to the overall symmetry and aesthetic appearance of the smart glasses. On the other hand, it facilitates disassembly and assembly of the first temple member 1 and the second temple member 2 of the second temple 102, and facilitates disassembly, assembly and maintenance of a first circuit board 20 arranged in an accommodating cavity of the second temple 102. It can be understood that for the second temple 102 with no external interface 30, there may no second circuit board 60 provided in the bent portion 4.

In this embodiment, at least one of the first fastener 40 and the second fastener 70 form a temple cap for the temple, and the hardness of the temple cap is greater than that of the temple to fix the tail end of the temple reliably and ensure the stability of connection of the external interface 30. Furthermore, since the bent portion 4 needs to be deformed frequently, and there is an angle between a bending direction and a direction of connection between the first temple member 1 and the second temple member 2, in this embodiment, the tail end of the temple is fixed by at least one of the first fastener 40 and the second fastener 70 with greater hardness, which can ensure the stability of combination of the first temple member 1 located on the outer side and the second temple member 2 located on the inner side.

Optionally, at least one of the first fastener 40 and the second fastener 70 are fixed to the tail end of the temple by bonding or snap-fitting. A bonding mode can ensure reliable fixation of the first temple member 1 and the second temple member 2, and ensure the reliability of connection of the external interface 30. A snap-fitting mode facilitates disassembly, assembly and maintenance of the first temple member 1 and the second temple member 2.

In some embodiments, as shown in FIG. 7, in the case the external interface 30 is a magnetic interface arranged at a side of the tail end of at least one of the first temple 101 and the second temple 102, a first fastener 40 may be not needed. The first temple member 1 and the second temple member 2 can be fixed by bonding, which can provide sufficient installation space for the magnetic interface and is condu-cive to an overall aesthetic appearance of the glasses.

In some embodiments, smart glasses are provided. The smart glasses include: a frame configured to accommodate optical components; a temple connected to the frame, including a first temple member and a second temple mem-ber, the first temple member and the second temple member being connected to define an accommodating cavity, and tail ends, which are away from the frame, of the first temple member and the second temple member defining an open-ing; a printed circuit board accommodated in the accommo-dating cavity; an external interface located at the tail ends, being electrically connected to the printed circuit board and in communication with the outside through the opening; and an interface fastener, which is an annular member, fitted over an outer periphery of the tail ends and fixedly connected to the tail ends, to fix the tail ends.

In some embodiments, smart glasses are provided. The smart glasses include: a frame configured to accommodate optical components and having opposite first and second sides; a first temple having a head end connected to the first side and a tail end defining a first opening; a second temple having a head end connected to the second side and a tail end defining a second opening; an external interface located at the tail end of the first temple and in communication with the outside through the first opening; an interface fastener, which is an annular member, fitted over the tail end of the first temple and fixed to the tail end of the first temple; and a closure fastener, which is a cap-shaped member, fitted over the tail end of the second temple and fixed to the tail end of the first temple, to close the second opening.

The above embodiments are only exemplary embodi-ments of the present application and are not intended to limit the present application. The scope of protection of the present application is limited by the claims. Those skilled in the art can make various modifications or equivalent sub-stitutions to the present application within the essence and scope of protection of the present application, and such modifications or equivalent substitutions shall also be deemed to fall within the scope of protection of the present application.

The invention claimed is:

1. Smart glasses, comprising:
a frame having two opposite sides, configured to accom-modate optical components;
a first temple and a second temple, having head ends respectively connected to the two opposite sides, the first temple and the second temple each comprising a first temple member and a second temple member arranged opposite to each other, the first temple mem-ber and the second temple member being connected to define an accommodating cavity;
a printed circuit board accommodated in the accommo-dating cavity;
an external interface provided at a tail end of at least one of the first temple and the second temple, and electri-cally connected to the printed circuit board; and
an interface fastener fitted over an outer periphery of the external interface, to fix tail ends of the connected first temple member and second temple member,
wherein the first temple member and the second temple member each comprise a straight portion and a bent portion connected in sequence from the head end to the tail end, and the bent portion comprises a first bent segment and a second bent segment connected in sequence from the straight portion, dimensions of the straight portion and dimensions of the second bent segment are both larger than dimensions of the first bent segment in width and thickness directions of the temple,
wherein the first temple member is made of a first material, the straight portion of the second temple member is made of a second material, and the bent portion of the second temple member is made of a third material, hardness of the second material is greater than that of the first material, and hardness of the first material is greater than that of the third material.

2. The smart glasses according to claim 1, wherein the interface fastener is an annular member, with a through opening at two opposite ends of the annular member.

3. The smart glasses according to claim 1, wherein the interface fastener is fixedly connected to the tail ends of the connected first temple member and second temple member.

4. The smart glasses according to claim 1, wherein hardness of the interface fastener is greater than that of the tail ends of the connected first temple member and second temple member.

5. The smart glasses according to claim 1, wherein the tail ends of the connected first temple member and second temple member jointly define an opening, and the external interface is located in the accommodating cavity and in communication with the outside through the opening.

6. The smart glasses according to claim 5, wherein the interface fastener is fitted over an outer periphery of the tail ends defining the opening, and a smooth transition is pro-vided at a connection between the interface fastener and the first temple member as well as the second temple member.

7. The smart glasses according to claim 1, wherein the external interface is arranged at the tail end of the first temple, and the smart glasses further comprises a closure fastener fitted over the tail end of the second temple, the closure fastener being a cap-shaped member, one of two opposite ends of the cap-shaped member being an opening and the other end being closed so as to close the tail end of the second temple.

8. The smart glasses according to claim 7, wherein the closure fastener is fixedly connected to the tail end of the second temple.

9. The smart glasses according to claim 7, wherein hardness of the closure fastener is greater than that of the tail end of the second temple.

10. The smart glasses according to claim 7, wherein a smooth transition is provided at a connection between the closure fastener and the second temple.

11. The smart glasses according to claim 1, wherein a first straight portion of the first temple member and a second straight portion of the second temple member are arranged opposite to each other to define a first accommodating cavity portion, and the printed circuit board is accommodated in the first accommodating cavity portion.

12. The smart glasses according to claim 1, wherein a first bent portion of the first temple member and a second bent portion of the second temple member are arranged opposite to each other to define a second accommodating cavity portion, and the smart glasses further comprises a flexible circuit board arranged in the second accommodating cavity portion, the external interface is electrically connected to the printed circuit board through the flexible circuit board.

13. The smart glasses according to claim 1, wherein in the thickness direction of the temple, the second temple member is adjacent to an inner side of the smart glasses, and a dimension of the first bent segment of the second temple member is larger than a dimension of the straight portion of the second temple member, and a first connection between the straight portions of the first temple member and the second temple member is more adjacent to the inner side of the smart glasses than a second connection between the first bent segment of the first temple member and the first bent segment of the second temple member.

14. Smart glasses, comprising:

a frame configured to accommodate optical components;

a temple connected to the frame, comprising a first temple member and a second temple member, the first temple member and the second temple member being connected to define an accommodating cavity wherein the temple comprises a head end and a tail end opposite the head end;

a printed circuit board accommodated in the accommodating cavity;

an external interface located at the tail end of the temple, being electrically connected to the printed circuit board and in communication with outside;

wherein the first temple member and the second temple member each comprise a straight portion and a bent portion connected in sequence from the head end to the tail end, wherein the first temple member is made of a first material, the straight portion of the second temple member is made of a second material, and the bent portion of the second temple member is made of a third material, hardness of the second material is greater than that of the first material, and hardness of the first material is greater than that of the third material.

15. The smart glasses according to claim 14, wherein the external interface is configured to be connected to an external device via a data cable to transmit at least one of signals, data, and electrical energy from the external device to the smart glasses by data cable transmission.

16. The smart glasses according to claim 14, wherein the external interface is a USB Type-C interface.

17. Smart glasses, comprising:

a frame configured to accommodate optical components and having opposite first and second sides;

a first temple having a head end connected to the first side and a tail end defining a first opening;

a second temple having a head end connected to the second side and a tail end defining a second opening, wherein each of the first temple and the second temple comprises a first temple member and a second temple member arranged opposite to each other;

an external interface located at the tail end of the first temple and in communication with the outside through the first opening;

an interface fastener being an annular member, fitted over the tail end of the first temple and fixed to the tail end of the first temple;

and a closure fastener being a cap-shaped member, fitted over the tail end of the second temple and fixed to the tail end of the first temple, to close the second opening, wherein the first temple member and the second temple member each comprise a straight portion and a bent portion connected in sequence from the head end to the tail end, wherein the first temple member is made of a first material, the straight portion of the second temple member is made of a second material, and the bent portion of the second temple member is made of a third material, hardness of the second material is greater than that of the first material, and hardness of the first material is greater than that of the third material.

18. The smart glasses according to claim 17, wherein the interface fastener has a dimension in an extending direction along the first temple similar to that of the closure fastener in an extending direction along the second temple.

* * * * *